Feb. 24, 1959  R. T. WHITCOMB  2,874,922
FUSELAGE SHAPING TO REDUCE THE STRENGTH OF SHOCK
WAVES ABOUT AIRPLANES AT TRANSONIC
AND SUPERSONIC SPEEDS
Filed Aug. 24, 1956  3 Sheets-Sheet 1

INVENTOR
RICHARD T. WHITCOMB

BY
R. S. Tompkins
ATTORNEYS

Feb. 24, 1959    R. T. WHITCOMB    2,874,922
FUSELAGE SHAPING TO REDUCE THE STRENGTH OF SHOCK
WAVES ABOUT AIRPLANES AT TRANSONIC
AND SUPERSONIC SPEEDS
Filed Aug. 24, 1956    3 Sheets-Sheet 2

INVENTOR
RICHARD T. WHITCOMB

BY

ATTORNEYS

Feb. 24, 1959 R. T. WHITCOMB 2,874,922
FUSELAGE SHAPING TO REDUCE THE STRENGTH OF SHOCK
WAVES ABOUT AIRPLANES AT TRANSONIC
AND SUPERSONIC SPEEDS
Filed Aug. 24, 1956 3 Sheets-Sheet 3

INVENTOR
RICHARD T. WHITCOMB

BY

ATTORNEYS

United States Patent Office 2,874,922
Patented Feb. 24, 1959

2,874,922

FUSELAGE SHAPING TO REDUCE THE STRENGTH OF SHOCK WAVES ABOUT AIRPLANES AT TRANSONIC AND SUPERSONIC SPEEDS

Richard T. Whitcomb, Hampton, Va.

Application August 24, 1956, Serial No. 606,176

10 Claims. (Cl. 244—130)

(Granted under Title 35, U. S. Code (1952), sec. 266)

The invention described herein may be manufactured and used by or for the Government of the United States of America for governmental purposes without the payment of any royalties thereon or therefor.

When the speed of an airplane approaches and exceeds the speed of sound, shock waves form about the configuration. These shock waves cause a marked increase in drag, or air resistance, buffet, noise, stability problems, and other adverse aerodynamic effects. It is an object of the present invention to reduce the strength of these shock waves and thus reduce the wave drag and other adverse effects through the proper shaping of the fuselage.

It has been found that the form and strength of the shock waves are dependent not on the forms of the individual components such as the wing, fuselage, and tail but on the form of the entire configuration as a whole. Further, it has been found that the form and strength of the shock waves near the speed of sound are primarily dependent on the longitudinal or streamwise development of the cross-sectional areas of the conguration normal to the airstream. Also, it has been found that at moderate supersonic speeds, the form and strength of the shock waves are primarily dependent on the longitudinal development of normal components of cross-sectional areas obtained with planes through the configuration which are inclined to the direction of the airstream. Since the shock strength at transonic and moderate supersonic speeds is primarily dependent on the longitudinal developments of cross-sectional area for the complete configuration, it is proposed that to reduce the shock strength for airplanes at these speeds, the volume of the fuselage or other components be distributed longitudinally such that this development of area for the complete configuration be such as theory and experiment indicate will produce weaker shock waves. With such a distribution of volume, the fuselage will usually have reversals of curvature in the longitudinal regions of the wing, tail surfaces, canopy, nacelles, etc.

The shapings produced with the present invention are arrived at by considering the flow over the complete configuration. Experiments indicate that the shapings provided by the present invention are effective in reducing the strength of shock waves for airplane configurations with all types of wings, and is not limited to airplane configurations with swept wings.

Reference is now made to the following description taken in connection with the accompanying drawings in which:

Fig. 7b is the longitudinal development of cross-sectional areas corresponding to Fig. 7a.

Fig. 8b is the longitudinal development of cross-sectional areas corresponding to Fig. 8a.

Figure 1:
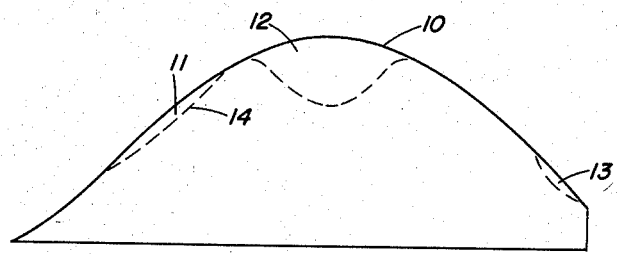
Fig. 1 is a diagram illustrating the procedure for arriving at the longitudinal development of fuselage cross-sectional area for reduced shock strength.
Figure 2A:
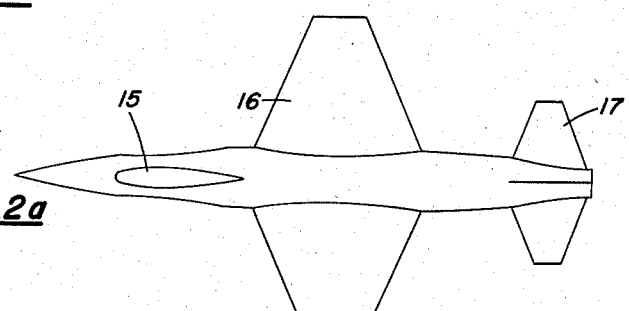
Fig. 2a is a plan view of a typical unswept wing-airplane configuration with the fuselage volume distributed on the basis of the present invention.
Figure 2B:
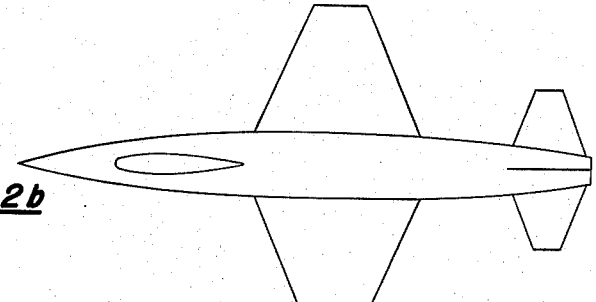
Fig. 2b is a plan view of a typical unswept wing-airplane configuration with the fuselage volume distributed normally.
Figure 3:
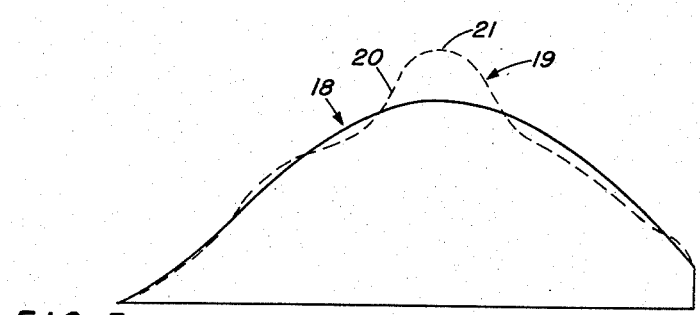
Fig. 3 is a diagram comparing the longitudinal developments of cross-sectional area for the configurations of Fig. 2a and Fig. 2b.

Referring now to the drawings, there is shown in Fig. 1 a horizontal line which represents the length of a particular aircraft. The curve 10 is the longitudinal development of cross-sectional area for an airplane that equals or approaches the development which theory or experiment indicates provides minimum shock strength at transonic or moderate supersonic speeds. In this case the Fig. 1 diagram is for the special conditions of fixed airplane length and volume. The areas 11, 12 and 13 are the normal cross-sectional areas of the pilot canopy, wing and tail surfaces, respectively. These areas are subtracted from the total cross-sectional development, represented by curve 10, to arrive at a fuselage area represented by the dotted line 14. The areas for other external parts such as nacelles would be subtracted in a similar manner. With such a development of the cross-sectional area for the fuselage, the fuselage of the configuration may appear as shown in Fig. 2a with reversal in curvature of the lines near the canopy 15, the wing 16 and the tail 17. For comparison, a normal streamlined fuselage with the same volume as that of Fig. 2a is shown in Fig. 2b. The longitudinal development of total cross-sectional area for the airplane with the specially shaped fuselage shown in Fig. 2a is compared with that for the airplane with the streamlined fuselage shown in Fig. 2b in Fig. 3. In this figure the solid line 18 is the area development for the configuration with the specially shaped fuselage (Fig. 2a) and may be seen to be free of severe maximum slopes or changes in slope, whereas the dotted line 19 represents the longitudinal development of cross-sectional area for the configuration with the streamlined fuselage (Fig. 2b) and may be seen to have relatively severe slopes of area relative to length, as at 20, and abrupt changes of these slopes, as at 21. The severe slopes of area with length and abrupt changes of these slopes produce relatively strong shock waves. On the other hand, near the speed of sound, the aircraft represented by the curve 18 and Fig. 2a has shock waves which are much weaker than that with the streamlined fuselage and the wave drag and other adverse effects associated with the shock waves are much less.

Figure 4:
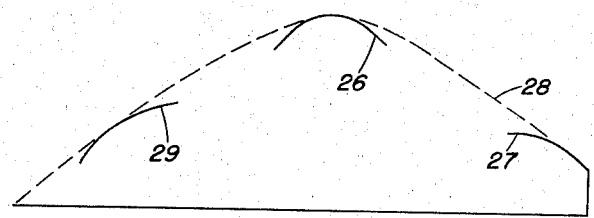
Fig. 4 is a diagram illustrating the procedure for arriving at the fuselage area development when certain cross-sectional areas of the fuselage are fixed.

For most airplane designs, certain total cross-sectional areas cannot be reduced beyond certain minimums because of the presence of fixed equipment inside the fuselage such as engines, landing gears, electronic equipment, etc. In Fig. 4 there is shown the beginning of the longitudinal development of cross-sectional area for an airplane, in which curve 25 represents the fixed minimum area for the fuselage plus canopy, curve 26 represents the fixed minimum for the fuselage plus wing and curve 27 represents the fixed minimum area for the fuselage plus tail surfaces. With these limitations the distribution of fuselage volume is determined by subtracting the normal cross-sectional areas for the canopy, wing, and tail surfaces from the longitudinal development of the total cross-sectional area that equals or approaches the development which provides minimum shock strength when enclosing the fixed area, such a development being represented by the dotted line curve 28 of Fig. 4.

Figure 5:
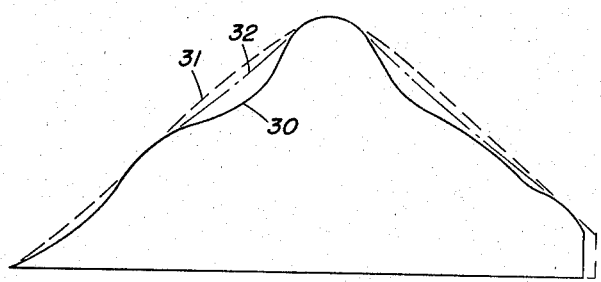
Fig. 5 is a diagram illustrating the procedure for determining areas to be added to the fuselage of an existing airplane design to obtain reductions in shock strength.

The present invention may also be used to reduce the shock strength of existing airplane designs through additions of volume to the fuselage. In Fig. 5 the solid line 30 represents the longitudinal development of total cross-sectional area for the typical representatives existing airplane shown in Fig. 6a. This longitudinal development of total cross-sectional area may be changed by adding volume to the airplane fuselage so that the modified airplane has a longitudinal development of total cross-sectional area as represented by the dashed line 31. Since the maximum slopes of area with length and the abrupt changes of slope are considerably less, the shock strength for the modified configuration is considerably smaller than that for the existing configuration. The modified configuration is shown in Fig. 6b.

Figure 6A:
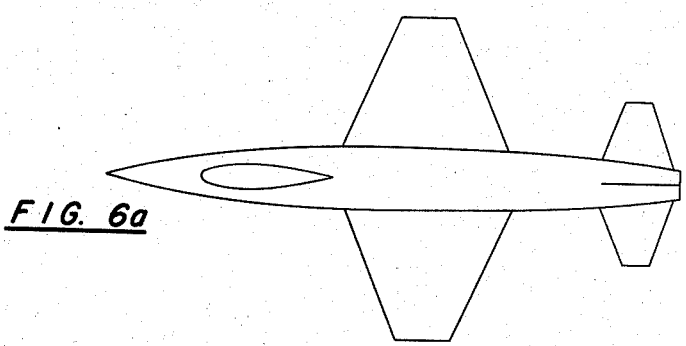
Fig. 6a shows a typical airplane configuration.

The longitudinal distribution of total cross-sectional area for the total airplane need not necessarily be exactly that for minimum shock strength to obtain significant reductions in shock strength. It need only approach the minimum shock development. For example, for the airplane configuration of Fig. 6a, represented by curve 30 of Fig. 5, the addition of volume of the fuselage ahead and behind the wing to provide the longitudinal development of total cross-sectional area represented by the dotted curve 32 of Fig. 5 would provide a reduction in shock strength nearly as great as that obtained with the volume added to provide the development of total area with minimum shock strength, as represented by curve 31 of Fig. 5.

Figure 6B:
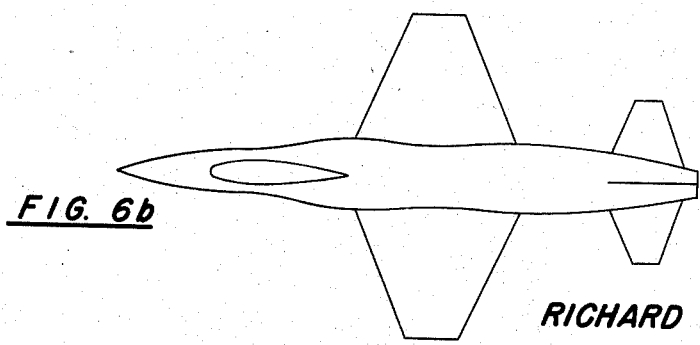
Fig. 6b shows the airplane configuration of Fig. 6a with volume added to obtain reductions in shock strength.

For some configurations, the relative magnitude of the cross-sectional area for the canopy, wing or tail surfaces may be such that when the areas for these components are subtracted from the development of total cross-sectional areas for minimum shock strength, the resulting longitudinal development of the cross-sectional area for the fuselage may not incorporate reversals of the curvature such as is shown in Figs. 2a and 6b, but may have merely regions of relatively gradual change of slope in the vicinity of these components. Nevertheless, the use of the special distribution of fuselage volume to provide this particular longitudinal development of total area will result in reduced shock strength for the configuration.

The above discussion is applicable to speeds at or near the sonic speed, wherein the disturbances producing shock waves are substantially normal to the air stream. At moderate supersonic speeds, the disturbances produced by a configuration radiate along cones, the elements of which are inclined to the air stream at the Mach angle. Parenthetically, it may be noted that the sine of the Mach angle is equal to the speed of sound divided by the forward velocity. To obtain the longitudinal distribution of the volume for the fuselage which provides reduced shock strength at moderate supersonic speeds, the procedure described above is modified by a more detailed analysis of the wing and tail surfaces cross-sectional areas, and of other external components such as stores, etc.

Figure 7A:
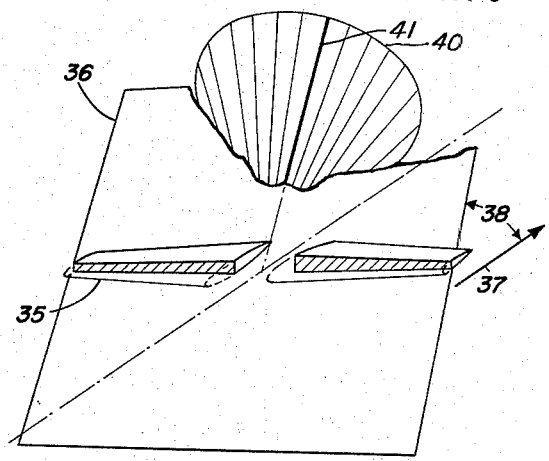
Fig. 7a illustrates the procedures for obtaining cross-sectional areas of the wing used to obtain fuselage shaping which provides reduction in shock strength at a supersonic speed.
Figure 7B:
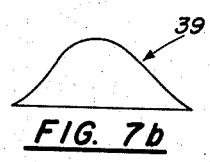

To obtain a complete area development for a wing in the supersonic case, a cutting plane tangent to an element of such an above mentioned cone with the cone axis at or near the airplane central longitudinal axis, and therefore at the Mach angle of the cone is "passed" through the wing at a succession of longitudinal stations. In Fig. 7a, this is illustrated by the cutting plane 36 tangent to a Mach cone 40 along the element 41 thereof and passed through the wing 35 at a Mach angle 38, arrow 37 designating the air stream direction. The area obtained at each pass of the intercepted cross-sectional plane 36 is projected normal to the air stream. The area development shown at 39 in Fig. 7b illustrates a development obtained by the successive passage of plane 36 through wing 35.

Figure 8A:
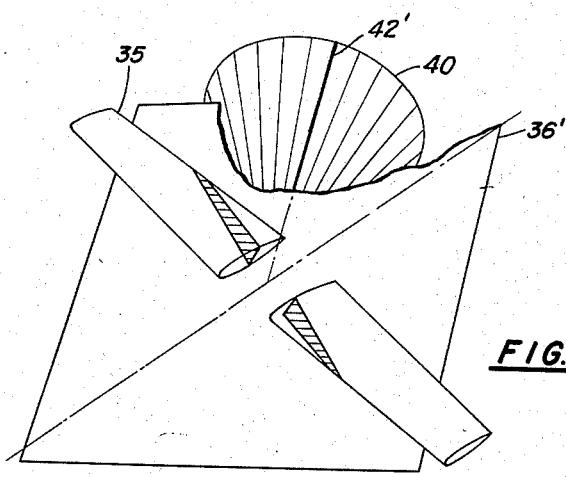
Fig. 8a illustrates the procedure for obtaining cross-sectional areas of the wing used to obtain fuselage shaping which provides reduction in shock strength at another supersonic speed.
Figure 8B:
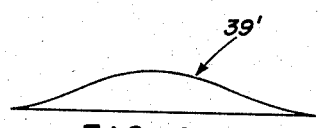

Thereafter, the cutting plane is rotated to be tangent to the Mach cone 40 along another element thereof, there being shown in Fig. 8a a cutting plane 36′ which is tangent to an element 42′ 45° from the element 41 utilized in Fig. 7a. Cutting plane 36′ passes through wing 35, as shown, and is passed through the wing at a succession of longitudinal stations, as above, to obtain the area development 39′ shown in Fig. 8b. In Fig. 8a, the wing 35 is shown rotated, rather than the cutting plane 36′, the difference being merely one of mechanical procedure.

The above procedure is repeated for the tail surfaces.

The arithmetical average of the wing area or tail developments obtained with the various rotations of the cutting plane is subtracted from a development of total area in a manner similar to that utilized with one area development for the wing or tail for a design for near the speed of sound. Area developments obtained with the wing or tail with the cutting plane rotated to several positions provides indications of the longitudinal distributions of the fuselage volume of minimum shock strength for most airplanes.

At sonic speeds and above, the disturbances produced by the airplane which produce adverse shock waves radiate in all directions. Those directed toward the wing or tail surfaces are reflected back, in much the same manner as a mirror reflects light waves. As a result, disturbances produced on one side of such a wing surface has little influence on the shock waves on the other side of the surface. To most satisfactorily define these shock-producing disturbances, the cross-sectional areas obtained by the cutting planes are divided at the wing plane. The areas for directly above and below the wing and horizontal tail planes are plotted longitudinally and considered separately.

Obviously many modifications and variations of the present invention are possible in the light of the above teachings. It is therefore to be understood that within the scope of the appended claims the invention may be practiced otherwise than as specifically described.

What is claimed is:

1. An airplane in which the cross-sectional area, in planes generally perpendicular to the longitudinal axis, has only a substantially decreasing rate of change from near the nose aft until the rate of change is zero, and has rearwardly of the zero rate of change point only a substantially negatively increasing rate of change.

2. An airplane in which the rate of increase in the cross-sectional area per unit length in planes generally perpendicular to the longitudinal axis is substantially constant from near the nose to near the maximum cross-sectional area.

3. In an airplane having a protruding cockpit canopy, a fuselage indented from normal configuration in the vicinity of said canopy, whereby the total cross-sectional area of said aircraft in the vicinity of said canopy is only gradually increased.

4. In an airplane, a fuselage, a protuberance extending from said fuselage, said fuselage being indented in the vicinity of said protuberance, the volume of said indentation from normal streamline configuration being approximately equal to the volume of said protuberance.

5. In an airplane, a fuselage, a protuberance extending from said fuselage, said fuselage being indented in the vicinity of said protuberance, the total area of the indentation from normal streamline configuration at any longitudinal station, in a plane substantially perpendicular to the fuselage longitudinal axis, being approximately equal to the total area of said protuberance in said plane.

6. An airplane having a fuselage in which the total cross-sectional area, comprising a first cross-sectional area taken of the fuselage in a plane generally perpendicular to the longitudinal axis and a second cross-sectional area taken of components external to the fuselage in planes tangent to the Mach cone whose axis is substantially on the central longitudinal axis of the airplane and projected normally to the airstream, gradually increases to a maximum and then decreases from nose to tail.

7. An airplane having a fuselage in which the total cross-sectional area, comprising a first cross-sectional area taken of the fuselage in a plane generally perpendicular to the longitudinal axis and a second cross-sectional area taken of components external to the fuselage in planes tangent to the Mach cone whose axis is substantially on the central longitudinal axis of the airplane and projected normally to the airstream has a decreasing rate of change from near the nose aft until the rate of change is zero, and has rearwardly of the zero rate of change point a negatively increasing rate of change.

8. An airplane having a fuselage in which there are only small changes in the total cross-sectional area thereof from nose to tail, said total cross-sectional area comprising a first cross-sectional area taken of the fuselage in a plane generally perpendicular to the longitudinal axis and a second cross-sectional area taken of components external to the fuselage in planes tangent to the Mach cone whose axis is substantially on the central longitudinal axis of the airplane and projected normally to the airstream.

9. An airplane having a fuselage in which the rate of increase in the total cross-sectional area per unit length is substantially constant from near the nose to near the maximum cross-sectional area, said total cross-sectional area comprising a first cross-sectional area taken of the fuselage in a plane generally perpendicular to the longitudinal axis and a second cross-sectional area taken of components external to the fuselage in planes tangent to the Mach cone whose axis is substantially on the central longitudinal axis of the airplane and projected normally to the airstream.

10. An airplane having a fuselage in which there are only small changes in the rate of increase in the total cross-sectional area per unit length, said total cross-sectional area comprising a first cross-sectional area taken of the fuselage in a plane generally perpendicular to the longitudinal axis and a second cross-sectional area taken of components external to the fuselage in planes tangent to the Mach cone whose axis is substantially on the central longitudinal axis of the airplane and projected normally to the airstream.

References Cited in the file of this patent

FOREIGN PATENTS

| | | |
|---|---|---|
| 301,390 | Germany | June 28, 1920 |
| 459,307 | Italy | Sept. 5, 1950 |
| 477,206 | France | July 6, 1915 |
| 931,003 | France | Sept. 15, 1947 |
| 932,410 | Germany | Sept. 1, 1955 |